United States Patent
Evans

(10) Patent No.: US 10,120,152 B1
(45) Date of Patent: Nov. 6, 2018

(54) ALL DIELECTRIC SELF-SUPPORTING FIBER OPTIC CABLE

(71) Applicant: Superior Essex International LP, Atlanta, GA (US)

(72) Inventor: Christopher Robert Evans, Kennesaw, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 15/894,972

(22) Filed: Feb. 13, 2018

(51) Int. Cl.
*G02B 6/44* (2006.01)

(52) U.S. Cl.
CPC ......... *G02B 6/4434* (2013.01); *G02B 6/4413* (2013.01); *G02B 6/4433* (2013.01)

(58) Field of Classification Search
None
See application file for complete search history.

(56) References Cited

U.S. PATENT DOCUMENTS

| | | | | |
|---|---|---|---|---|
| 4,693,551 A * | 9/1987 | Blanco | ................... | G02B 6/441 385/113 |
| 6,052,502 A * | 4/2000 | Coleman | .............. | G02B 6/4407 385/100 |
| 6,185,351 B1 * | 2/2001 | Daneshvar | ........... | G02B 6/4432 385/114 |
| 6,654,525 B2 * | 11/2003 | Nechitailo | ........... | G02B 6/4434 385/100 |
| 9,400,362 B2 * | 7/2016 | Hudson | ................ | G02B 6/4434 |
| 2002/0041743 A1 * | 4/2002 | Schneider | ............ | G02B 6/4419 385/101 |
| 2003/0123824 A1 * | 7/2003 | Tatarka | .................. | G02B 6/441 385/113 |
| 2003/0215198 A1 * | 11/2003 | Newton | ............... | G02B 6/4413 385/113 |
| 2004/0037522 A1 * | 2/2004 | Sutehall | ............... | G02B 6/4429 385/113 |
| 2008/0013899 A1 * | 1/2008 | Gowan | ................ | G02B 6/4434 385/113 |
| 2008/0145009 A1 * | 6/2008 | Mumm | ................ | G02B 6/4429 385/113 |
| 2009/0129733 A1 * | 5/2009 | Keller | .................. | G02B 6/4413 385/103 |
| 2009/0304338 A1 * | 12/2009 | Davidson | ............. | G02B 6/4413 385/111 |
| 2013/0202262 A1 * | 8/2013 | Haymore | ............. | G02B 6/4494 385/111 |

FOREIGN PATENT DOCUMENTS

GB 2085188 A * 4/1982
JP 2001-328189 A * 11/2001

* cited by examiner

*Primary Examiner* — Michael Stahl

(57) ABSTRACT

An all-dielectric self-supporting (ADSS) cable may include a central strength member and a plurality of buffer tubes helically wrapped around the central member. Each of the plurality of buffer tubes may house at least one optical fiber, and an outer jacket may surround the plurality of buffer tubes and the central strength member. Additionally the central strength member may include a plurality of different strength layers including a first layer formed from relatively flexible material and a second layer formed from relatively rigid material.

20 Claims, 3 Drawing Sheets

ALL DIELECTRIC SELF-SUPPORTING FIBER OPTIC CABLE

TECHNICAL FIELD

Embodiments of the disclosure relate generally to fiber optic cables and, more specifically, to all dielectric self-supporting cables.

BACKGROUND

Optical fiber cables have been utilized in a wide variety of different application, such as premise, underground, and aerial applications. In aerial applications, a cable is typically suspended between two poles or other points, thereby subjecting the cable to tensile stresses and environmental stresses (e.g., temperature stresses, wind, snow, ice, etc.). These stresses can lead to increase optical fiber attenuation and negatively impact cable performance. In order to address aerial applications, certain cables include messenger or suspension wires that help to support the cable's load; however, these wires increase installation cost and may attract lightning. To avoid messenger wires, all-dielectric self-supporting ("ADSS") cables have been developed in which optical fibers are positioned within loose buffer tubes that are stranded around a central strength member. Aramid yarns are then wrapped around the buffer tubes in order to support the weight of the cable over suspended areas. The materials in the cables are exclusively dielectric in order to avoid lighting strikes and to allow the cables to be placed in power regions, such as power regions of a pole from which the cables are suspended.

The stranding of aramid yarns around the optical fiber buffer tubes increases the weight, cost, and overall diameter of conventional ADSS cables. As a result of wrapping the aramid yarns around the buffer tubes, a greater amount of aramid material must necessarily be used. The amount of needed material increases as the number and/or size of the buffer tubes increases. Accordingly, there is an opportunity for improved ADSS cables that incorporate flexible strength members, such as aramid yarns, into a central strength member. In particular, there is an opportunity for improved ADSS cables in which a central strength member includes both a relatively rigid layer and a relatively flexible layer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
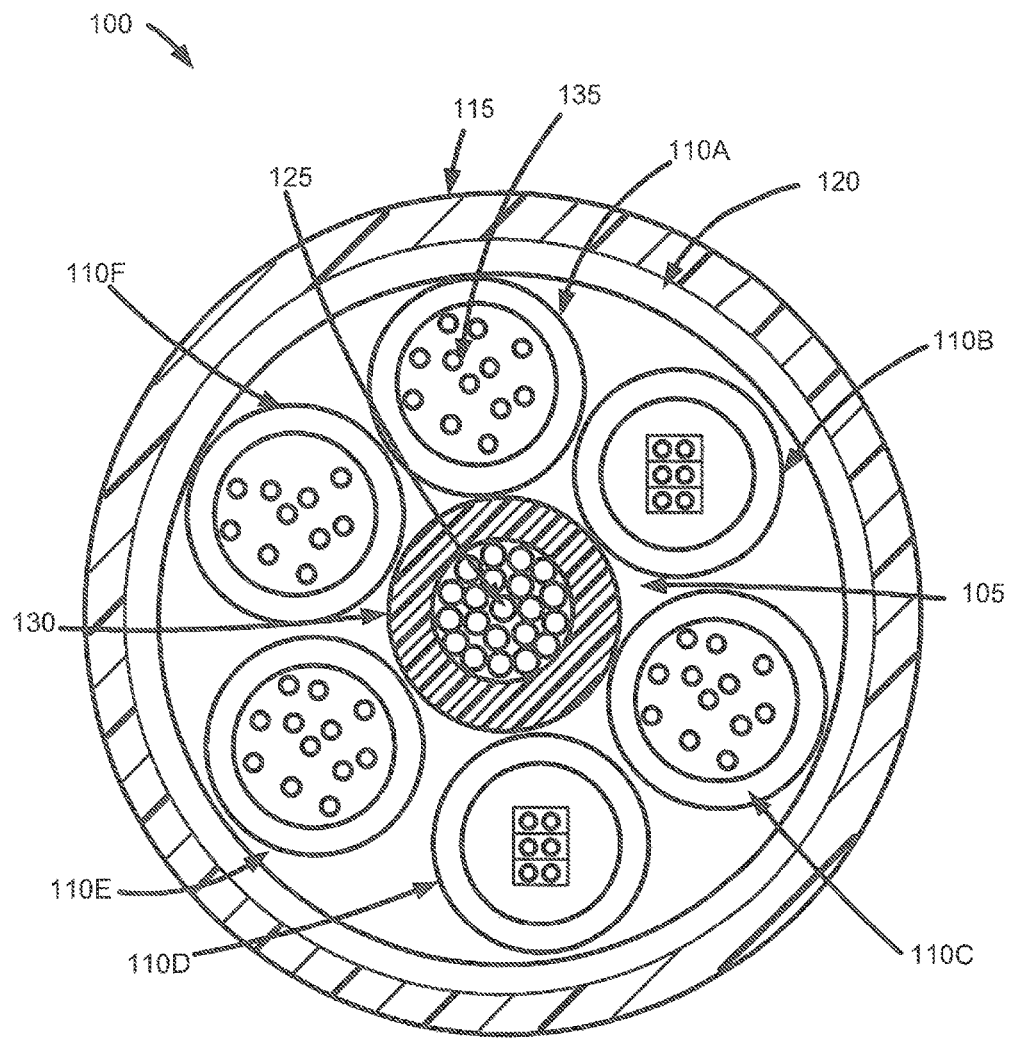
FIG. 1 is a cross-sectional view of an example ADSS cable, according to an illustrative embodiment of the disclosure.

Various embodiments of the present disclosure are directed to all-dielectric self-supporting ("ADSS") fiber optic cables that include central strength members ("CSMs") having a plurality of layers. According to an aspect of the disclosure, a CSM may include both a relatively flexible strength layer, such as a layer formed from aramid yarns, and a more rigid strength layer, such as a layer formed from glass reinforced plastic. In certain embodiments, a flexible strength layer may be positioned around a more rigid strength layer. In other embodiments, a rigid strength layer may be positioned or formed around a flexible strength layer. In yet other embodiments, a rigid strength layer may be positioned around a first flexible strength layer, and a second flexible strength layer may be positioned around the rigid strength layer.

In one example embodiment, an ADSS cable may include a CSM, and a plurality of buffer tubes may be helically twisted about or otherwise positioned around the CSM. Each of the buffer tubes may house one or more optical fibers. According to an aspect of the disclosure, the CSM may include at least two strength layers and a first strength layer may have a higher flexural modulus than the second strength layer. In other words, a CSM may include both a relatively flexible strength layer (e.g., a strength layer formed from aramid yarns or other strength yarns) and a more rigid strength layer (e.g., a strength layer formed from glass reinforced plastic, etc.). As desired, one or more outer wraps may be formed around the CSM and the plurality of buffer tubes, such as one or more binders, one or more layers of water blocking material, and/or one or more additional strength layers. A jacket or outer sheath may then be formed around the other components of the ADSS cable.

Conventional ADSS cables typically include buffer tubes wrapped around a rigid CSM, such as a glass reinforced plastic CSM. A layer of aramid yarns is then formed around the buffer tubes. By contrast, certain embodiments of the disclosure utilize a CSM that incorporates multiple strength layers. The multi-layer CSM's may provide a wide variety of benefits relative to conventional ADSS cables. For example, an amount of strength yarns (e.g., aramid yarns, etc.) incorporated into an ADSS cable may be reduced while providing desired overall strength to support the weight of the cable. Fewer strength yarns may be positioned near the center of the cable to support the same axial load as an outer layer of strength yarns. Accordingly, an overall amount of material incorporated into an ADSS cable may be reduced. In certain embodiments, an overall cost and/or outer diameter or size of an ADSS cable may also be reduced. Additionally, with an outer wrap of strength yarns, the yarns may compress the buffer tubes when the cable is under tension, potentially leading to damage and/or reduced performance of the optical fibers housed within the buffer tubes. By contrast, when strength yarns are incorporated into the CSM, tension on the buffer tubes may be reduced and/or a more uniform strength distribution may be provided by the CSM.

In certain embodiments, a flexible strength layer (e.g., strength yarns, etc.) may be incorporated into a CSM as an inner layer. A more rigid layer, such a glass reinforced plastic, may then be formed around the inner layer. Typically, when strength yarns are incorporated into a cable, different vector forces are exhibited as the strength yarns are wrapped or twisted along a longitudinal direction. For example, as a strength yarn is wrapped around a cable component (e.g., buffer tubes, etc.), the various support forces provided by the strength yarn may extend in different directions depending on an amount of twist and/or orientation of the strength yarn. However, by incorporating strength yarns as an inner layer of a CSM, the strength yarns may be aligned by a more rigid layer, thereby providing relatively uniform strength distribution within an ADSS cable.

Certain example embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 depicts a cross-sectional view of an example ADSS cable 100, according to an illustrative embodiment of the disclosure. The ADSS cable 100 may be suitable for use in a wide variety of applications, such as suspension in an aerial environment. The illustrated ADSS cable 100 may include a longitudinally extending central strength member ("CSM") 105, a plurality of longitudinally extending buffer tubes 110A-F positioned around the CSM 105, and a jacket 115 formed around the plurality of buffer tubes 110A-F and the CSM 105. In certain embodiments, one or more outer wraps 120 may be positioned between the buffer tubes 110A-F and the jacket 120. Each of these components is described in greater detail below. Additionally, in certain embodiments, each of the components of the ADSS cable 100 may be formed from dielectric or non-conductive materials.

The CSM 105 may provide strength and structural support for the ADSS cable 100 and the other components of the cable 100. For example, the CSM 105 may provide desired tensile and/or compressive strength that supports the axial load of ADSS cable 100 and assists in preventing or limiting attenuation within the optical fibers. In certain embodiments, the CSM 105 may also assist the ADSS cable 100 in resisting thermal expansion and contraction.

The CSM 105 may be formed from a wide variety of suitable materials and/or combinations of materials. According to an aspect of the disclosure, the CSM 105 may include or be formed with a plurality of different strength layers. For example, the CSM 105 may include both a relatively flexible layer 125 and a relatively rigid layer 130. Conventional ADSS cables typically include a rigid CSM positioned between a plurality of buffer tubes, and a separate layer of aramid yarns formed around the buffer tubes. The inventive ADSS cable 100 may incorporate a portion or all of the aramid yarns or other flexible strength members that would conventionally be formed around the buffer tubes into the CSM 105. As a result, the ADSS cable 100 may utilize less aramid yarns or other flexible strength members than conventional ADSS cables while still providing desirable structural and tensile support.

In certain embodiments, as shown in FIG. 1, the flexible layer 125 may be formed as an inner layer of the CSM 105. The rigid layer 130 may then be formed or positioned around the flexible layer 125. Typically, when strength yarns are incorporated into a cable, different vector forces are exhibited as the strength yarns are wrapped, twisted, or bent along a longitudinal direction. For example, as a strength yarn is wrapped around a buffer tube or other cable component, the strength yarn may impart forces in different directions depending on an amount of twist and/or orientation of the strength yarn. However, by incorporating strength yarns or other flexible strength material as an inner flexible layer 125 of a CSM 105, the flexible layer may be aligned by the rigid layer 130, thereby providing relatively uniform strength distribution within the ADSS cable 100.

In other embodiments, as described in greater detail below with reference to FIG. 2, the rigid layer 130 may be formed as an inner layer of the CSM 105. The flexible layer 125 may then be formed or positioned around the rigid layer 130. In yet other embodiments, the CSM 105 may be formed with more than two strength layers. Indeed, the CSM 105 may be formed with any suitable number of layers. As one example, as described in greater detail below with reference to FIG. 3, a CSM 105 may include a first layer of strength yarns or other flexible material, a second rigid layer formed around the first layer, and a third layer formed around the rigid layer. The third layer may include any suitable strength materials. In certain embodiments, the third layer may be formed as a flexible layer, for example, from aramid yarns or other strength yarns. As desired, the strength yarns may be similar to those used in the first layer. In other embodiments, the strength yarns of a third layer may be different than those used in the first layer. For example, the two sets of strength yarns may be formed from different materials and/or with different dimensions (e.g., yarn size, layer thickness, etc.).

The flexible layer 125 may be formed from any suitable materials and/or combinations of materials. Examples of suitable materials that may be utilized to form the flexible layer 125 include, but are not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, and/or any other relatively flexible strength materials. In certain embodiments, a flexible layer 125 may be formed from one or more materials that have a Young's Modulus or elastic modulus of approximately 600 MPa, 607 MPa, or greater. Additionally, in accordance with an aspect of the disclosure, the flexible layer 125 and/or the strength materials (e.g., aramid yarn, etc.) utilized to form the flexible layer 125 may have a flexural modulus of less than approximately 10 MPa. In certain embodiments, the flexible layer 125 may have a negligible flexural modulus because the flexible layer 125 and the components of the flexible layer 125 (e.g., strength yarns, etc.) may be capable of being bent or folded.

The flexible layer 125 may be formed with any suitable dimensions as desired in various embodiments. For example, the flexible layer 125 may be formed with any suitable thickness, diameter (e.g., for a flexible layer 125 formed as an inner layer of the CSM 105, etc.), inner and/or outer diameter (e.g., for a flexible layer 125 formed around a rigid layer 130, etc.), and/or other dimensions. In certain embodiments, a flexible layer 125 may be formed with a thickness of approximately 0.1, 0.2, 0.25, 0.3, 0.4, 0.5, 0.6, 0.75, 0.8, 1.0, 1.2, 1.25, 1.4, 1.5, 1.6, 1.75, 1.8, 2.0, 2.25, 2.5, 2.75, 3.0, 3.25, 3.5, 3.75, 4.0, 4.25, 4.5, 4.75, 5.0, 5.25, or 5.5 mm, a thickness included in a range between any two of the above values (e.g., a thickness between approximately 0.1 mm and approximately 2.0 mm, etc.), or a thickness included in a range bounded on either a minimum or maximum end by one of the above values (e.g., a thickness of at least 0.5 mm, etc.). In other embodiments, a flexible layer 125 may be formed with a diameter of approximately 0.5, 0.6, 0.8, 1.0, 1.25, 1.5, 1.75, 2.0, 2.25, 2.5, 2.75, 3.0, 3.25, 3.5, 3.75, 4.0, 4.25, 4.5, 4.75, 5.0, 5.25, or 5.5 mm, a diameter included in a range between any two of the above values (e.g., a diameter between approximately 0.8 mm and approximately 5.5 mm, etc.), or a diameter included in a range bounded on either a minimum or maximum end by one of the above values.

In the event that strength yarns (e.g., aramid yarns, etc.) are utilized to form the flexible layer 125, any suitable number of strength yarns may be utilized. Additionally, the strength yarns may have any suitable dimensions, such as any suitable diameters and/or cross-sectional areas. For example, a strength yarn may have a diameter or thickness between approximately 0.005 mm and approximately 0.10 mm. Further, any suitable number of layers of strength yarns may be incorporated into a flexible layer 125. As desired in various embodiments, the strength yarns may be helically twisted together in a longitudinal direction to form the flexible layer 125. For example, a plurality of strength yarns may be helically twisted together to form a flexible layer 125 that constitutes an inner layer of the CSM 105. In other embodiments, the strength yarns may be helically wrapped around another component of the CSM 105 to form flexible layer. For example, a plurality of strength yarns may be helically wrapped around a rigid layer 130.

The rigid layer 130 of the CSM 105 may be formed from a wide variety of materials and/or combinations of materials that are relatively less flexible than the flexible layer 125. Examples of suitable materials that may be utilized to form the rigid layer 130 include, but are not limited to, glass reinforced plastic ("GRP"), fiber reinforced plastic ("FRP"), fiberglass, fiberglass/epoxy composite, and/or other materials that are more rigid than the flexible layer 125. In certain embodiments, a rigid layer 130 may be formed from one or more materials that have a Young's Modulus or elastic modulus of approximately 600 MPa, 607 MPa, or greater. Additionally, in certain embodiments, the rigid layer 130 and/or the materials utilized to form the rigid layer 130 may have a flexural or bending modulus between approximately 500 MPa and approximately 8,000 MPa. For example, the rigid layer 130 may have a flexural modulus of approximately 500, 750, 1,000, 1,500, 2,000, 2,500, 3,000, 4,000, 5,000, 6,000, 7,000, 7.500, or 8,000, 10,000, 12,000, 15,000, 18,000, 20,000, 22,000, or 25,000 MPa, a flexural modulus included in a range between any two of the above values, or a flexural modulus bounded on a minimum end by one of the above values (e.g., a flexural modulus greater than approximately 500 MPa, etc.).

The rigid layer 130 may be formed with any suitable dimensions as desired in various embodiments. For example, the rigid layer 130 may be formed with any suitable thickness, diameter (e.g., for a rigid layer 130 formed as an inner layer of the CSM 105, etc.), inner and/or outer diameter (e.g., for a rigid layer 130 formed around a flexible layer 125, etc.), and/or other dimensions. In certain embodiments, a rigid layer 130 may be formed with a thickness of approximately 0.5, 0.75, 1.0, 1.25, 1.5, 1.75, 2.0, 2.25, 2.5, 3.0, 3.25, 1.5, 4.0, 4.25, or 4.5 mm, a thickness included in a range between any two of the above values (e.g., a thickness between approximately 0.5 mm and approximately 2.5 mm, etc.), or a thickness included in a range bounded on either a minimum or maximum end by one of the above values. In other embodiments, a rigid layer 130 may be formed with a diameter of approximately 1.0, 1.25, 1.5, 1.75, 2.0, 2.25, 2.5, 2.75, 3.0, 3.25. 3.5, 3.75, 4.0, 4.25, or 4.5 mm, a diameter included in a range between any two of the above values, or a diameter included in a range bounded on either a minimum or maximum end by one of the above values.

In certain embodiments, such as embodiments in which a rigid layer 130 is formed as an outer layer of the CSM 105, an optional coating may be formed on the rigid layer 130. For example, a polymeric or other coating may be extruded onto or otherwise formed around the rigid layer 130. Examples of suitable materials that may be utilized to form a coating include, but are not limited to, polyethylene (e.g., medium density polyethylene, etc.), polypropylene, one or more other polymeric materials, one or more thermoplastic materials, one or more elastomeric materials, an ethylene-acrylic acid ("EAA") copolymer, ethyl vinyl acetate ("EVA"), etc.

The overall CSM 105 (and/or any number of constituent layers of the CSM 105) may be formed with any suitable cross-sectional shape and/or dimensions. For example, in certain embodiments, the CSM 105 may have a circular cross-sectional shape. In other embodiments, the CSM 105 may be formed with an elliptical, square, rectangular, hexagonal, octagonal, or any other suitable cross-sectional shape. Additionally, the overall CSM 105 may be formed with any suitable dimensions, such as any suitable diameter and/or cross-sectional area. In certain embodiments, the CSM 105 may have a diameter between approximately 1.2 mm and approximately 8.5 mm. In other embodiments, the CSM 105 may have a diameter of approximately 1.2, 1,5, 2.0, 2.5, 3.0, 3.5, 4.0, 4.5, 5.0. 5.5, 6.0, 6.5, 7.0. 7.5, 8.0. or 8.5 mm, a diameter incorporated into a range between any two of the above values, or a diameter included in a range bounded on either a minimum or maximum end by one of the above values.

As desired, one or more dimensions (e.g., thickness, diameter, etc.) of the CSM 105 and/or various layers of the CSM 105 (e.g., the flexible layer 125, the rigid layer 130, etc.) may be determined based at least in part on the desired overall construction of the ADSS cable 100. For example, one or more dimensions (e.g., overall diameter, layer thickness, layer diameter, etc.) may be optimized in order to provide a desired strength to weight ratio for the ADSS cable 100 based at least in part upon the number of buffer tubes, buffer tube diameters and/or other buffer tube dimensions, number of optical fibers incorporated into the buffer tube, jacket thickness, and/or weight of other cable components. As another example, the dimensions of the CSM 105 and/or various layers of the CSM 105 may be optimized based at least in part upon a desired operating environment for the ADSS cable 100 and/or one or more industry and/or technical standards or specifications.

A multi-layer CSM 105 may provide a wide variety of benefits relative to conventional ADSS cables. For example, an amount of strength yarns (e.g., aramid yarns, etc.) incorporated into the ADSS cable 100 may be reduced relative to conventional cables while providing desired overall strength to support the weight of the ADSS cable 100. Accordingly, an overall amount of material incorporated into an ADSS cable 100 may be reduced. In certain embodiments, an overall cost and/or outer diameter or size of an ADSS cable 100 may also be reduced. Additionally, with a conventional outer wrap of strength yarns, the yarns may compress the buffer tubes when the cable is under tension, potentially leading to damage and/or reduced performance of the optical fibers housed within the buffer tubes. By contrast, when strength yarns are incorporated into the CSM 105, tension on the buffer tubes 110A-F may be reduced and/or a more uniform strength distribution may be provided by the CSM 105.

With continued reference to FIG. 1, a plurality of butler tubes 110A-F may be incorporated into the ADSS cable 100. Although six buffer tubes 110A-F are illustrated in FIG. 1, any other suitable number of buffer tubes may be utilized as desired. In certain embodiments, the buffer tubes 110A-F may be stranded or helically twisted around the CSM 105. In other embodiments, the buffer tubes 110A-F may be S-Z stranded around the CSM 105. Each buffer tube (generally referred to as buffer tube 105) may be configured to contain or house one or more optical fibers 135. Any number of optical fibers, other transmission elements, and/or other components may be positioned within a buffer tube 110. In certain embodiments, optical fibers 135 may be loosely positioned in a buffer tube 100, wrapped or bundled together, or provided in one or more ribbons or ribbon stacks.

Each buffer tube 110 may be formed with any suitable cross-sectional shapes and/or dimensions. For example, the buffer tube 110 may have a circular cross-sectional shape. As another example, the buffer tube 110 may have an inner diameter that facilitates the housing of a desired number of optical fibers 135. The buffer tube 105 may also be formed with a wide variety of suitable outside diameters. In certain embodiments, the number of buffer tubes 110A-F utilized and the sizes of the buffer tubes 110A-F may be selected in order to provide a desirable cable geometry. For example, the ADSS cable 100 may be formed with a six around one arrangement with six buffer tubes 110A-F formed around a CSM 105. The buffer tubes 110A-F and the CSM 105 may be sized such that the cable has a desirable overall cross-sectional shape, such as an approximately circular cross-sectional shape. Other numbers, sizes, and/or combinations of buffer tubes and a CSM 105 may be utilized as desired in other embodiments.

A buffer tube 110 may be formed from any suitable materials or combinations of materials. Examples of suitable materials include, but are not limited to, various polymers or polymeric materials, polyethylene ("PE"), high density polyethylene ("HDPE"), polypropylene ("PP"), acrylate or acrylics (e.g., acrylic elastomers, etc.), polyvinyl chloride ("PVC"), polyurethane, a fluoropolymer, neoprene, polyvinylidene fluoride ("PVDF"), polybutylene terephthalate ("PBT"), ethylene, plastic, or other appropriate materials or combinations of suitable materials. Additionally, a buffer tube 110 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins.

Any number of optical fibers 135 may be housed within a buffer tube 110 as desired in various embodiments. Each optical fiber may be a single mode fiber, multi-mode fiber, pure-mode fiber, polarization-maintaining fiber, multi-core fiber, or some other optical waveguide that carries data optically. Additionally, each optical fiber may be configured to carry data at any desired wavelength (e.g., 1310 nm, 1550 nm, etc.) or combination of wavelengths and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness. In certain embodiments, an optical fiber may include a core that is surrounded by a cladding. Additionally, one or more suitable coatings may surround the cladding.

In certain embodiments, a plurality of optical fibers 135 may be loosely positioned within a buffer tube 110. In other embodiments, a plurality of optical fibers 135 may be arranged into one or more suitable bundles or groupings. As desired, each group of fibers may include one or more suitable wraps or binders that maintains the fibers in a group. For example, a wrap or binder may be helically wrapped around the fibers in a group. Examples of suitable binders include, but are not limited to, identification threads (e.g., a colored thread that facilitates identification of a group of optical fibers, etc.), water-blocking threads, strength yarns, etc. In yet other embodiments, a plurality of optical fibers 135 may be arranged into one or more fiber ribbons and/or into a ribbon stack. For example, optical fibers may be formed or incorporated into a plurality of different ribbon arrangements that are stacked on top of one another to form a ribbon stack. As another example, optical fibers may be formed into one or more ribbon arrangements that are folded or otherwise manipulated into a stacked or other configuration. As yet another example, optical fibers may be arranged in one or more ribbons that each include intermittent, spaced, or spiderweb-type bonding that permits the ribbons to be bundled, rolled, and/or otherwise formed into a desired arrangement.

In certain embodiments, a suitable filling compound may be utilize to fill the buffer tube 110. In other words, a filling compound may be utilized to fill the interstitial spaces within the buffer tube 110 that are not occupied by optical fibers 135 (or other components). A wide variety of filling compounds may be utilized as desired. For example, a water-blocking gel, such as Polymer Fiber Matrix ("PFM") gel manufactured and marketed by Superior Essex International LP, may be utilized as a filling compound. Other suitable filling compounds, such as water-blocking gels, grease, foam materials, etc. may be utilized as desired. In other embodiments, the ADSS cable 100 may be formed as a "dry" cable that does not include filling compound. As desired, water-blocking tapes, water-blocking wraps, water-blocking yarns, strength yarns (e.g., aramid yarns), water-blocking powders, moisture absorbing materials, dry inserts, and/or a wide variety of other suitable materials may be incorporated into the buffer tube 110. In certain embodiments, a "dry" cable component may be formed as a relatively continuous layer that is incorporated into the buffer tube 110. For example, a "dry" cable component may be wrapped around, enclose, or entrap certain optical fibers 135. In other embodiments, a "dry" cable component may include a plurality of discrete components that are intermittently wrapped, partially wrapped, or otherwise positioned within the buffer tube 110 at any number of desired locations (e.g., a plurality of spaced locations, in a relatively continuous manner, etc.) along a longitudinal length of the ADSS cable 100.

Additionally, in certain embodiments, one or more dielectric spacers, fillers, or other components may be utilized in place of one or more of the buffer tube 110A-F. Alternatively, one or more empty buffer tubes may be utilized. Spacers, fillers, and/or empty buffer tubes may be utilized to provide the ADSS cable 100 with a desired overall cross-sectional shape. As one example, an ADSS cable 100 may be designed to house a number of optical fibers that may be placed into five buffer tubes. A dielectric filler may be substituted for a sixth buffer tube in order to provide the ADSS cable 100 with a desired six around one design or geometry (e.g., six elements around the CSM 105).

With continued reference to FIG. 1, an outer jacket 115 may be formed around the CSM 105 and the buffer tubes 110A-F. The jacket 115 may define an outer periphery of the ADSS cable 100. The jacket 115 may enclose the internal components of the ADSS cable 100, seal the cable 100 from the environment, and provide some strength and structural support. The jacket 115 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the jacket 115 may also include flame retardant materials, smoke suppressant materials, carbon black or other suitable material for protection against exposure to ultraviolet ("UV") light, and/or other suitable additives. The jacket 115 may include a single layer or, alternatively, multiple layers of material (i.e., multiple layers of the same material, multiple layers of different materials, etc.). As desired, the jacket 115 may be characterized as an outer sheath, a casing, a circumferential cover, or a shell.

The jacket 115 may enclose one or more openings in which other components of the ADSS cable 100, such as the CSM 105 and the buffer tubes 110A-F, are disposed. At least one opening enclosed by the jacket 115 may be referred to as a cable core, and any number of suitable cable components may be disposed in a cable core. A wide variety of other components may be situated within a cable core as desired, such as other transmission media, a power conductor, etc. Indeed, a wide variety of different cable constructions may be utilized in accordance with various embodiments of the disclosure.

The jacket 115 may be formed with a wide variety of suitable cross-sectional shapes and/or other dimensions. For example, as shown in FIG. 1, the jacket 115 may be formed with a circular or round cross-sectional shape. In other embodiments, the jacket 115 may be formed with an elliptical or other suitable cross-sectional shape. Additionally, the jacket 115 may be formed with a wide variety of suitable dimensions, such as any suitable inner diameter (i.e., a diameter defining a core size of the ADSS cable 100) and/or outer diameter (i.e., a diameter defining the overall size of the ADSS cable 100).

In certain embodiments, one or more outer wraps 120, layers, or other cable components may be positioned between the plurality of buffer tubes 110A-F and the jacket 115. A wide variety of suitable outer wraps 120 may be utilized as desired in different embodiments. In one example embodiment, one or more binders may be wrapped around the buffer tubes 110A-F in order to hold the buffer tubes 110A-F in place. For example, one or more binders may be helically wrapped around the buffer tubes 110A-F. As another example, a plurality of binders may be wrapped around the buffer tubes 110A-F at a respective plurality of longitudinally spaced locations, such as at S-Z stranding switchbacks. A binder may be formed from a wide variety of suitable materials, such as suitable threads, polymeric tapes, or other materials. Additionally, a binder may have a wide variety of suitable dimensions, such as any suitable diameter, cross-sectional area, or width (e.g., a width of a binder tape, etc.).

As another example of an outer wrap 120, an inner jacket may be formed around the plurality of buffer tubes 110A-F in order to maintain the positions of the buffer tubes 11A-F. As desired, one or more additional layers may be positioned between the inner jacket and the outer jacket 115, such as a water-blocking layer and/or a strength layer. An inner jacket may be formed from a wide variety of suitable materials, such as any of the materials discussed above for the outer jacket 115. Additionally, an inner jacket may be formed with any suitable thickness and/or other dimensions.

As another example of an outer wrap 120, one or more water-blocking layers may be positioned outside of the buffer tubes 110A-F. For example, one or more water-blocking threads may be helically wrapped around the buffer tubes 110A-F or positioned adjacent to the buffer tubes 110A-F within the ADSS cable 100. As another example, a water-blocking tape may be wrapped around the buffer tubes 110A-F. Indeed, a water-blocking component may be formed with a wide variety of suitable constructions (e.g., yarns, tapes, etc.). Additionally, a water-blocking component may include any number of suitable water-blocking materials, such as super absorbent polymers ("SAP") and/or other suitable materials. Additionally, in certain embodiments, a water-blocking component may be formed as a relatively continuous layer that is incorporated into the ADSS cable 100. For example, a water-blocking component may be a continuous component that is wrapped around or positioned adjacent to the buffer tubes 110A-F. In other embodiments, a water-blocking component may include a plurality of discrete components that are intermittently wrapped, partially wrapped, or otherwise positioned about the buffer tubes 110A-F at any number of desired locations a plurality of spaced locations, in a relatively continuous manner, etc.) along a longitudinal length of the ADSS cable 100.

As yet another example of an outer wrap 120, in certain embodiments, a strength layer may be finned around the plurality of buffer tubes 110A-F. For example, a layer of strength yarns, such as aramid yarns or any of the other strength yarns discussed above with reference to the CSM 105 may be wrapped or otherwise formed around the plurality of buffer tubes 110A-F. The strength layer may be formed with any suitable dimensions, such as any suitable thickness. in the event that strength yarns are used, any number of strength yarns may be incorporated into the strength layer, and the strength yarns may have any suitable diameter and/or other dimensions.

In certain embodiments, the ADSS cable 100 may distribute strength yarns between the CSM 105 and an outer strength layer. In other words, a first portion of the strength yarns typically included in an outer layer of conventional ADSS cables may be moved to the CSM 105 while a second portion of the strength yarns remains in an outer layer or wrap. In such a design, the overall number and size of strength yarns may still be reduced relatively to conventional ADSS cables. In certain embodiments, the reduced number of yarns may result in reduced cost and/or a reduced diameter of the ADSS cable 100 relative to conventional ADSS cables. In other embodiments, a supplemental strength layer may be provided in an outer wrap in addition to the strength layers of the CSM 105, thereby enhancing the overall strength of the ADSS cable 100. Indeed, a wide variety of combinations of CSM and outer strength layers that incorporate strength yams may be utilized as desired in various embodiments.

Additionally, as desired in various embodiments, the ADSS cable 100 may be designed in order to satisfy the requirements of a wick variety of different industry standards. For example, the ADSS cable 100 may be designed to satisfy the requirements of IEEE Standard 1222 for all-dielectric self-supporting cables, as promulgated by the Institute of Electrical and Electronics Engineers. As another example, the ADSS cable 100 may be designed to satisfy the ADSS requirements of the National Electrical Safety Code ("NESC") for light, medium, and/or heavy loads.

Figure 2:
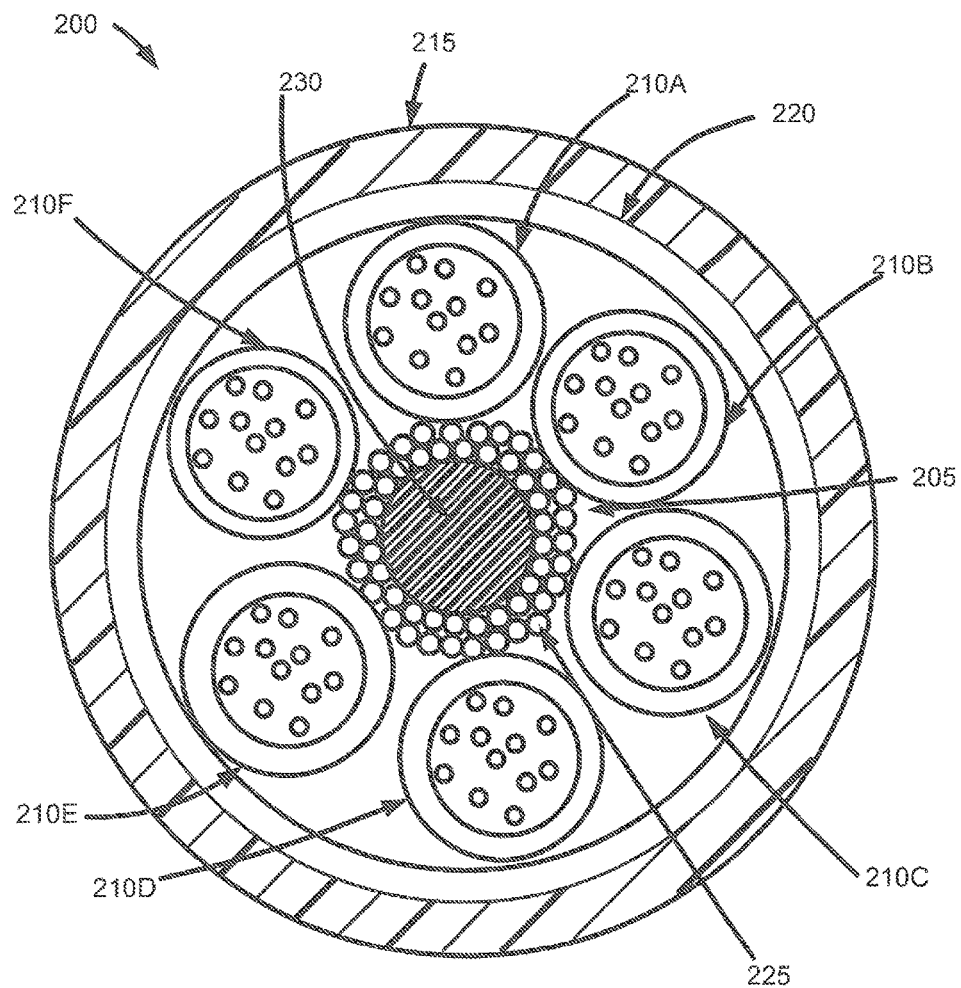
FIG. 2 is a cross-sectional view of another example ADSS cable, according to an illustrative embodiment of the disclosure.

FIG. 2 depicts a cross-sectional view of another example ADSS cable 200, according to an illustrative embodiment of the disclosure. The ADSS cable 200 may include components that are similar to those of the ADSS cable 100 depicted in FIG. 1 and described in greater detail above. For example, the ADSS cable 200 may include a longitudinally extending central strength member ("CSM") 205, a plurality of longitudinally extending buffer tubes 210A-F positioned around the CSM 205, and a jacket 215 formed around the plurality of buffer tubes 210A-F and the CSM 205. In certain embodiments, one or more outer wraps 220 may be positioned between the buffer tubes 210A-F and the jacket 220. With the exception of the CSM 205, each of these components may be similar to the corresponding components illustrated in FIG. 1.

Both the ADSS cable 100 of FIG. 1 and the ADSS cable 200 of FIG. 2 include a CSM that incorporates both a flexible layer and a rigid layer. However, the ADSS cable 200 of FIG. 2 includes a CSM 205 in which a flexible layer 225 is formed around a rigid layer 230. In other words, the rigid layer (e.g., a glass reinforced plastic layer, etc.) 230 may be formed as an inner layer of the CSM 205. A relatively flexible layer of strength members 225, such as a layer of aramid yarns or other strength yarns, may then be wrapped or otherwise positioned around the rigid layer 230. The constructions of the flexible layer 225 and the rigid layer 230, such as the materials and dimensions of the layers, may be similar to those discussed above with reference to the CSM 105 of FIG. 1.

Figure 3:
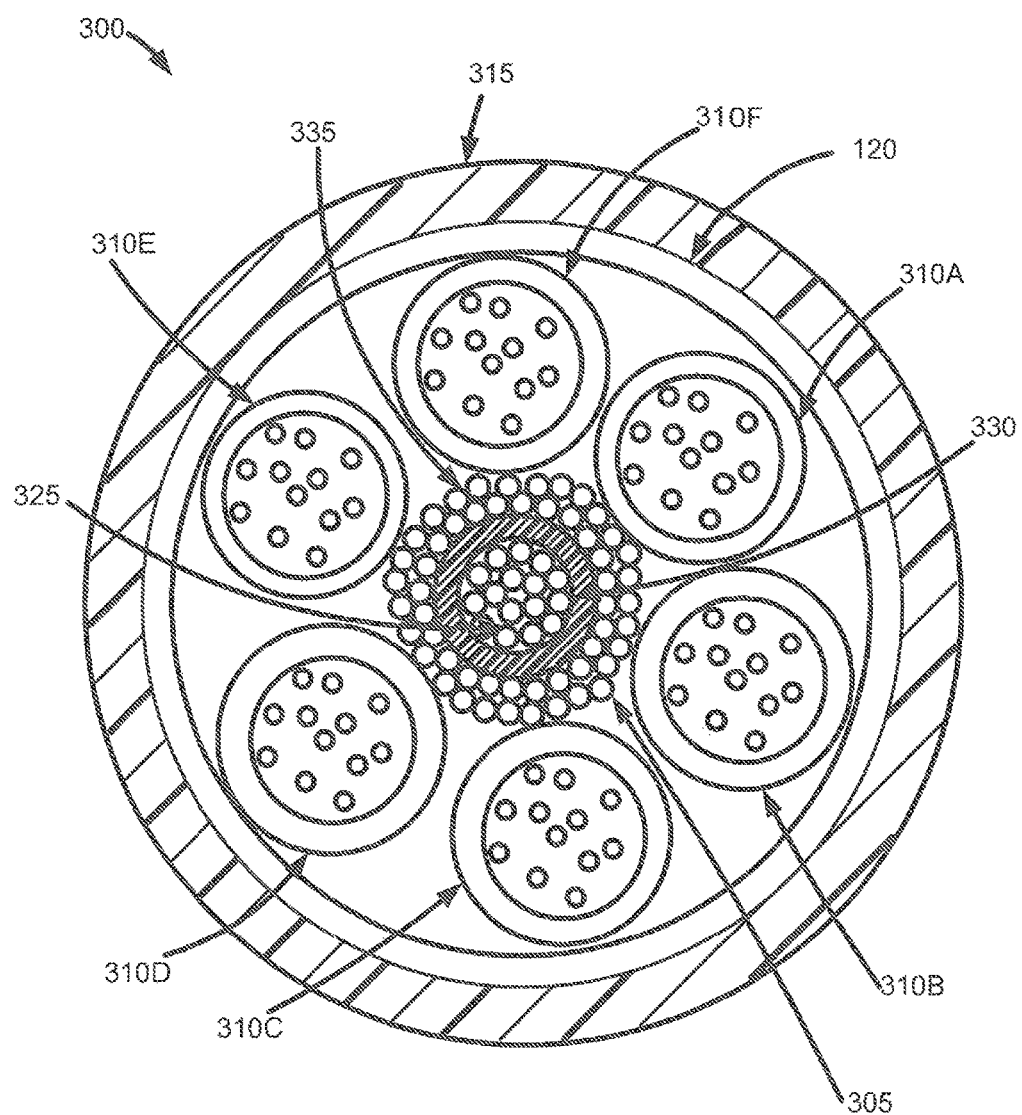
FIG. 3 is a cross-sectional view of another ADSS cable, according to an illustrative embodiment of the disclosure.

FIG. 3 depicts a cross-sectional view of another example ADSS cable 300, according to an illustrative embodiment of the disclosure. The ADSS cable 300 may include components that are similar to those of the ADSS cable 100 depicted in FIG. 1 and described in greater detail above. For example, the ADSS, cable 300 may include a longitudinally extending central strength member ("CSM") 305, a plurality of longitudinally extending buffer tubes 310A-T positioned around the CSM 305, and a jacket 315 formed around the plurality of buffer tubes 310A-F and the CSM 305. In certain embodiments, one or more outer wraps 320 may be positioned between the buffer tubes 310A-F and the jacket 320. With the exception of the CSM 305, each of these components may be similar to the corresponding components illustrated in FIG. 1.

However, while the ADSS cable 100 of FIG. 1 depicts a CSM 105 having two distinct strength layers (e.g., a flexible layer 125 and a rigid layer 130), the ADSS cable 300 of FIG. 3 depicts a CSM 305 that includes three distinct strength layers. In particular, the CSM 305 may include a first layer 325 formed as a flexible layer from one or more flexible strength members, such as one or more aramid yarns or other strength yarns. A second layer 330 may then be formed as a rigid layer around the first layer 325. For example a glass reinforced plastic layer may be formed as a second layer 330 around the first layer 325. A third layer 335 may then be formed as another flexible layer around the second layer 330. For example, another layer of aramid yarns or other strength yarns may be formed around the rigid layer. As desired, any number of suitable strength layers may be incorporated into a CSM 305. Additionally. the constructions of the flexible layers 325, 335 and the rigid layer 330, such as the materials and dimensions of the layers, may be similar to those discussed above with reference to the CSM 105 of FIG. 1.

The ADSS cables 100, 200, 300 illustrated in FIGS. 1-3 are provided by way of example only to illustrate a few ADSS cable constructions that may incorporate central strength members with a plurality of different strength layers. A wide variety of other components may be incorporated into an ADSS cable as desired in other embodiments. For example, an ADSS cable may include a wide variety of suitable transmission media, a wide variety of different types of tubes, water-blocking materials, water-swellable materials, insulating materials, dielectric materials, gels, fillers, and/or other materials. Additionally, a cable may be designed to satisfy any number of applicable cable standards.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations arc in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

That which is claimed:

1. An all-dielectric self-supporting (ADSS) cable, comprising:
    a central strength member comprising:
        a first layer having a flexural modulus greater than 500 MPa: and
        a second layer comprising a plurality of strength yarns helically twisted around the first layer, the second layer having a flexural modulus less than 10 MPa and an elastic modulus greater than 600 MPa;
    a plurality of buffer tubes helically wrapped around the central strength member, each of the plurality of buffer tubes housing at least one optical fiber; and
    an outer jacket surrounding the plurality of buffer tubes and the central strength member.

2. The ADSS cable of claim 1, wherein the plurality of strength yarns comprise aramid strength yarns.

3. The ADSS cable of claim 1, wherein the plurality of strength yarns comprise at least one of (i) basalt fiber, (ii) ultra-high-molecular weight polyethylene, or (iii) fiberglass.

4. The ADSS cable of claim 1, wherein the first layer comprises glass reinforced plastic.

5. The ADSS cable of claim 1, further comprising a strength layer formed around the plurality of buffer tubes.

6. An all-dielectric self-supporting (ADSS) cable, comprising:
   a central strength member comprising:
      a first layer comprising a rigid material having a flexural modulus greater than 500 MPa; and
      a second layer comprising a plurality of strength yarns helically twisted around the first layer, the second layer having a flexural modulus less than 10 MPa, the plurality of strength yarns comprising at least one of (i) aramid yarn, (ii) basalt fiber, (iii) ultra-high molecular weight polyethylene, or (iv) fiberglass;
   a plurality of buffer tubes helically wrapped around the central strength fiber, each of the plurality of buffer tubes housing at least one optical fiber; and
   an outer jacket surrounding the plurality of buffer tubes and the central strength member.

7. The ADSS cable of claim 6, wherein the plurality of strength yarns comprise an elastic modulus greater than 600 MPa.

8. The ADSS cable of claim 6, wherein the plurality of strength yarns comprise a plurality of aramid yarns.

9. The ADSS cable of claim 6, wherein the plurality of strength yarns have a flexural modulus less than 10 MPa.

10. The ADSS cable of claim 6, wherein the first layer comprises glass reinforced plastic.

11. The ADSS cable of claim 6, further comprising a strength layer formed around the plurality of buffer tubes.

12. An all-dielectric self-supporting (ADSS) cable, comprising:
   a central strength member comprising:
      a first layer comprising a plurality of strength yarns helically twisted together; and
      a second layer comprising a rigid material having flexural modulus greater than 500 MPa formed around the first layer;
   a plurality of buffer tubes helically wrapped around the central strength member, each of the plurality of buffer tubes housing at least one optical fiber; and
   an outer jacket surrounding the plurality of buffer tubes and the central strength member.

13. The ADSS cable of claim 12, wherein the second layer comprises glass reinforced plastic.

14. The ADSS cable of claim 13, wherein the plurality of strength yarns comprises a first plurality of strength yarns, and wherein the central strength member further comprises a third layer formed around the second layer, the third layer comprising second plurality of strength yarns.

15. The ADSS cable of claim 14, wherein the second plurality of strength yarns are helically twisted around the second layer.

16. The ADSS cable of claim 12, further comprising a strength layer formed around the plurality of buffer tubes.

17. The ADSS cable of claim 12, wherein the first layer has a flexural modulus less than 10 MPa.

18. The ADSS cable of claim 12, wherein the first layer has an elastic modulus greater than 600 MPa.

19. The ADSS cable of claim 12, wherein the plurality of strength yarns comprise aramid yarns.

20. The ADSS cable of claim 12, wherein the plurality of strength yarns comprise at least one of (i) basalt fiber, (ii) ultra-high-molecular weight polyethylene, or (iii) fiberglass.

* * * * *